Feb. 2, 1960  J. SEME  2,923,650
METHOD OF AND DEVICE FOR HEAT-INSULATING PIPING FOR
THE LONG-DISTANCE CONVEYANCE OF HEATING FLUIDS
Filed March 22, 1956  2 Sheets-Sheet 1
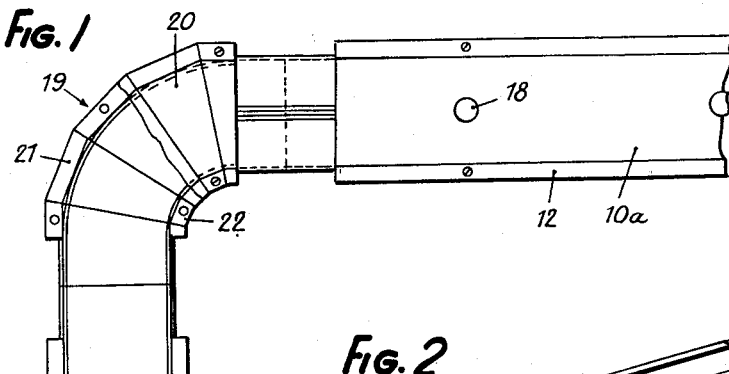
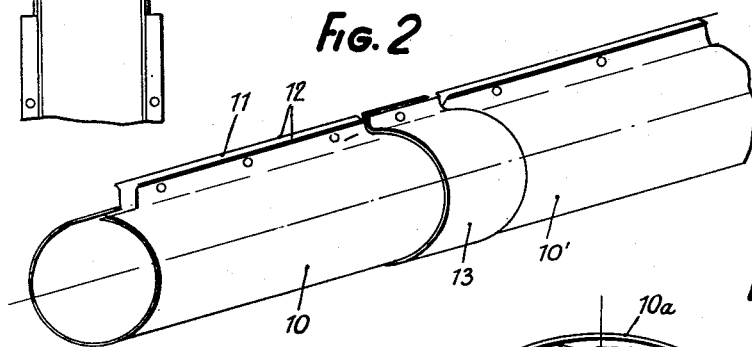
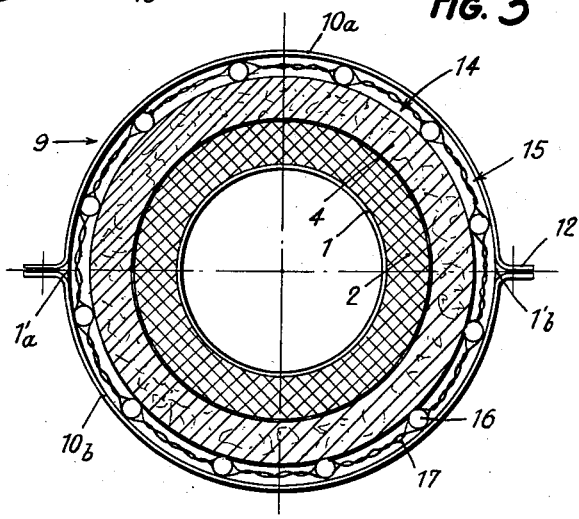
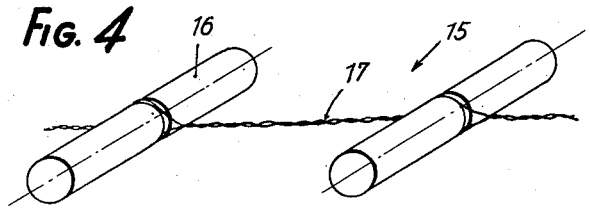
INVENTOR:
JEAN SEME
By
Richardson, David and Nordon
Atty's

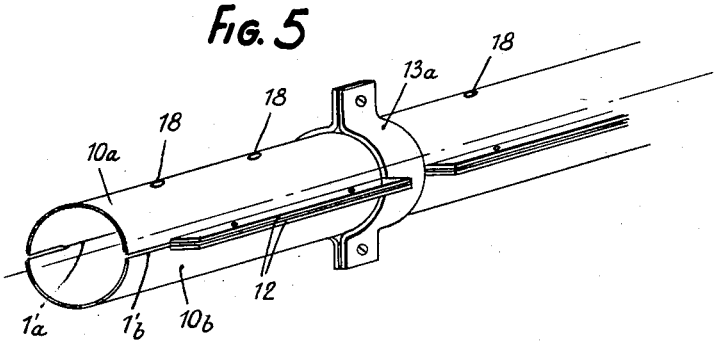
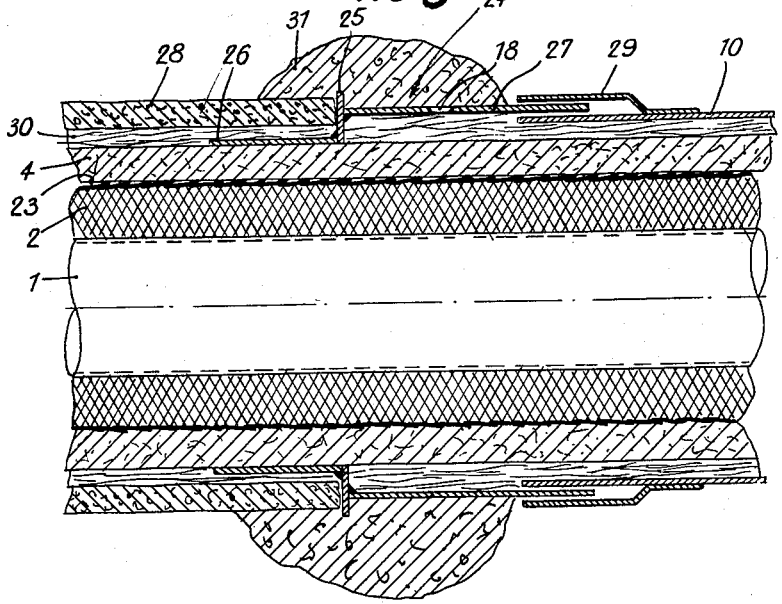
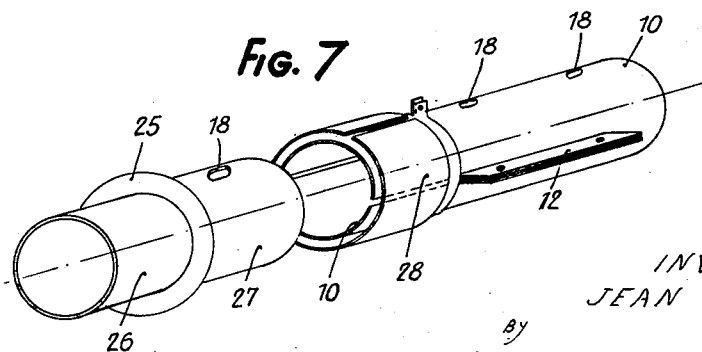

United States Patent Office 2,923,650
Patented Feb. 2, 1960

2,923,650
METHOD OF AND DEVICE FOR HEAT-INSULATING PIPING FOR THE LONG-DISTANCE CONVEYANCE OF HEATING FLUIDS

Jean Seme, Paris, France

Application March 22, 1956, Serial No. 573,111

Claims priority, application France March 30, 1955

1 Claim. (Cl. 154—44)

This invention relates in general to the heat-insulation or lagging of piping and more particularly to a method of heat-insulating metal piping for the long-distance conveyance of heating fluids, which is remarkable notably in that it consists in forming around the pipes, before laying same, at least one first heat-insulating protective covering and at least one mechanically resistant covering protecting both the first insulating covering or coverings and the pipes proper.

According to another feature of this invention there is provided between the outer surface of the piping and the first heat-insulating covering means permitting the free thermal expansion of the pipe metal without spoiling the surrounding heat-insulating covering.

This invention is also concerned with a device for carrying out the method broadly set forth hereinabove, which is remarkable notably in that it comprises two successive coverings placed around the piping, the inner covering consisting of one or more heat-insulating layers, the outer covering consisting of at least one layer of mechanically-resistant material adapted to protect both the piping and the inner covering.

According to a further feature of this invention the outer covering consists of at least two joined shells surrounding the heat-insulating covering.

It will be noted that the inner diameter of these joined shells is slightly greater than the outer diameter of the last or outermost layer of heat-insulating material.

Under these conditions the narrow annular gap left between the joined shells of concrete or like material and the outer surface of the last or outermost heat-insulating covering may be filled with hardening material, for example waterproof material.

From the foregoing it will be readily understood that the method and device according to this invention make it possible to lag piping intended for conveying heating fluids (steel piping being generally employed to this end) by using a composite covering structure adapted to meet the following four requirements:

(i) They provide a high degree of heat insulation, thereby reducing heat losses to a minimum;

(ii) They offer a substantial mechanical resistance, particularly to shocks;

(iii) They are highly damp-proof due to the layer of waterproof material cast between the mechanically-resistant covering and the heat-insulating covering; and (iv) They allow a free expansion of the metal constituting the piping, without damaging the heat-insulating layers.

As a result, the piping systems constructed in accordance with the teachings of this invention may be laid or buried directly in the ground without any further protection.

Other features and advantages of this invention will appear as the following description proceeds with reference to the attached drawings forming part of this specification and illustrating diagrammatically by way of example a few forms of embodiment of the invention. In the drawings:

Figure 1 is a plane view showing a pipe section according to a modified embodiment;

Figure 2 is another isometric view showing one portion of the outer covering of the structure shown in Fig. 1, and a clamping collar for assembling two adjacent sections;

Figure 3 is a cross-sectional view showing a pipe section provided with a covering of the type illustrated in Fig. 2;

Figure 4 is another isometric view showing a detail of the structure of Fig. 3;

Figure 5 is an isometric view showing one portion of the outer covering according to a modified embodiment, with a clamping collar connecting a pair of adjacent pipe sections;

Figure 6 is a longitudinal section of one portion of a pipe, showing the junction between a pipe having a concrete outer covering and another pipe having a sheet-metal outer covering or casing of the type shown in Fig. 1; and Figure 7 is an isometric view showing the sheet-metal covering elements of Fig. 6.

In the example illustrated in Figs. 1 to 4 the pipe is covered by a metal sheathing 9 consisting of steel-plate sections 10, 10' having an upper aperture 11 formed along one generatrix; this metal sheathing may also consist of a pair of trough-shaped shells 10a, 10b (Fig. 8) joined along a pair of diametrically opposite generatrices 1'a, 1'b disposed for example in a substantially horizontal plane. Along the aperture 11 or generatices 11a, 11b the sheath elements are formed with flanges 12 adapted to be assembled by bolts, rivets or any other suitable fastening means.

Preferably, the metal sheathing made of several sections 10, 10' . . . having an aperture formed along one generatrix is used for piping of relatively small diameter, and the structure shown in Fig. 3 and comprising two halves or shells 10a, 10b is used for small and large-diameter pipes to permit the compensation of the thermal expansion differences through the relative displacement of the shells.

The assembling of adjacent sections 10, 10' . . . of the device is made by using either collars or like clamping means 13 also open along one generatrix (Fig. 2), or cooperating half-collars 13a (Fig. 5).

An annular gap 14 is left between the metal sheathing 9 and a low-temperature insulator 4 when assembling the parts, so that a waterproof binder or like compound adapted to set may be cast therein. This gap 14 is formed by interposing rings 15 or like elements between the sheathing 9 and the insulator 4. These rings 15 may consist for example of rods 16 made of hardwood or like material, interconnected by galvanized and twisted iron wire 17. At the same time, this ring is quite useful as a means for centering the outer covering on the heat-insulated piping. Of course, any other suitable, spacer-forming rings or like elements may be used between the covering and the piping, without departing from the teachings of this invention.

In the case of piping of moderate diameter the annular gap 14 is filled through the aperture formed in each section along an upper generatrix, and in the case of sections made of two halves the filling operation takes place through holes 18 formed to this end in the upper half element 10a (Fig. 5).

A right-angle pipe bend is shown at 19 in Fig. 1. This bend may be dimensioned to permit the use of commercial elbows. It consists of shell elements 20 of cylindrical-wedge shape, assembled by welding. Each element 20 constitutes the envelope of a torus or anchor-ring segment of which the diameter corresponds to the shells of straight elements or sections. The elbows may consist of a pair of elements 21, 22 assembled by means of bolts or like fastening means. The straight elements are assembled with the curved elements by means of collars similar to those already described hereinabove for assembling straight elements with one another.

The device so far described is laid as follows:

All metal components are delivered on the site with a layer of bituminous paint already applied thereto. Moreover, after laying and before burying the piping a fresh coating may be applied on the outer metal parts.

The pipes are heat-insulated either when they are secured in their final position in the bottom of the trench or when they lie in an intermediate position before their definitive laying.

When high-temperature fluids are to be conveyed it is rather advantageous to use a pair of concentrical heat-insulating joined shells having if desired different characteristics and adapted therefore to adapt themselves to the temperature of the fluid medium. It is very important that, in addition, the joints overlap each other both longitudinally and transversely between two layers of shells.

Preferably, the strip-covering will be provided intermediate the two shells, just under the cork shell, to avoid the risk that the compound filling the space 14 leaks into the high-temperature lagging 4.

In the case of low-temperature piping the tar-impregnated tape 23 is preferably wound directly on the tube.

When the heat-insulating shells are fitted and wire-wound for example with galvanized iron wire, centring collars are fitted at spaced locations.

The shells are assembled by pairs by bolting, and laid in end-to-end relationship, a suitable gap being left therebetween which is subsequently bridged by the assembling collar.

The filling material is then cast through the holes 14 provided to this end in the upper shells. To effect this operation a funnel made of very thin sheet-metal material may advantageously be used, the nose-piece of this funnel having preferably a shouldered portion whereby the funnel may fit in the filling holes. This filling operation is effected much more easily than with a concrete external lagging.

The conventional expansion-loop receiving chambers may be dispensed within this arrangement, the expansion loop consisting in this case of three straight elements assembled by four elbows. These expansion loops are dimensioned for example according to the conventional method employed in trough-laid piping systems. These expansion loops are covered with suitably dimensioned steel-sheathed non-conducting tubes.

If a branch pipe is to be made the branch will consist of a pair of T-shaped half-shells (not shown) with the two surfaces joined through an element of frusto-conical shape. These two half-shells are assembled by bolting or fastening and connected to the adjacent elements through assembling collars, and preferably the main pipe is cut slantwise with a reinforcing bracket.

In the case of high-temperature piping, the first heat-insulating layer is accurately fitted on the tube and on the cut portion by using a galvanized wire-winding. When the strip covering is completed the second cork shell is fitted wherever possible so as to leave the minimum voids between the portions covered by the shells. The centring collars are subsequently fitted and the shells of the steel covering are assembled. Before fitting these steel shells it is possible to apply a layer of compound, particularly in the tapered portions, for example by soaking and drying in the surrounding atmosphere. When the half-shells are assembled on the branch pipe, powdered cork is rammed in the aforesaid voids left by the covering shells. Then, a compound product is poured through the uppermost portion of the branch.

Figures 6 and 7 illustrate one possible example of a connection between a concrete covering and a steel covering in a heat-insulated piping.

This connection is effected by using a sleeve 24 comprising an abutment-forming annulus 25 on which a pair of cylinders 26, 27 are secured for example by welding. The cylinder 26 is fitted in the concrete lagging 28 and the other cylinder 27 engages a fixed collar 29 carried by a straight element 10 of the steel plate covering.

The space between the lagging 4 and the cylinders 26, 27 is filled with compound 30 and a concrete annular block 31 secures the abutment-forming annulus 25 on the concrete covering 28.

Of course, any other metal or alloy may be substituted for the steel plates constituting the shell coverings in the embodiments illustrated, and on the other hand the invention is not restricted to the few forms of embodiment shown and described herein, as many modifications may be contemplated without departing from the spirit and scope of the invention.

What I claim is:

A heat-insulating device for metal piping of the type used for the conveyance of heating fluids comprising a first heat-insulating layer surrounding said piping, strip means impregnated with a water-proof substance and overlapping said first layer, a further heat-insulating layer surrounding said strip means, a sheathing encompassing said pipe, strip means and heat-insulating layers and comprising pairs of opposed elongated semi-cylindrical shells of sheet metal having their longitudinal edges in face-to-face relationship in horizontal planes, an outwardly extending horizontal flange formed integrally with each of said longitudinal edges of each of said pairs of shells and each extending longitudinally to points spaced from the adjacent ends of its respective shell, means for interconnecting opposed flanges, means for telescopically connecting adjoining pairs of said shells, and pairs of cooperating half-collars encompassing said telescopically joined portions of said shells between adjacent flanges, the uppermost of said shells being provided with longitudinally spaced filling holes for receiving waterproofing substance therethrough.

References Cited in the file of this patent

UNITED STATES PATENTS

| | | |
|---|---|---|
| 244,066 | Martin | July 12, 1881 |
| 262,429 | Johns | Aug. 8, 1882 |
| 2,405,330 | Ryder | Aug. 6, 1946 |
| 2,532,587 | Williamson | Dec. 5, 1950 |
| 2,545,030 | Isenberg et al. | Mar. 13, 1951 |
| 2,650,180 | Walker | Aug. 25, 1953 |
| 2,735,449 | Grahame | Feb. 21, 1956 |
| 2,773,512 | Burk | Dec. 11, 1956 |